United States Patent [19]
Fried et al.

[11] Patent Number: 5,686,872
[45] Date of Patent: Nov. 11, 1997

[54] TERMINATION CIRCUIT FOR COMPUTER PARALLEL DATA PORT

[75] Inventors: Rafael Fried, Caesarea; Erez Bar-Niv, Raanana, both of Israel

[73] Assignee: National Semiconductor Corporation, Santa Clara, Calif.

[21] Appl. No.: 402,639

[22] Filed: Mar. 13, 1995

[51] Int. Cl.$^6$ .................................. H01P 1/24
[52] U.S. Cl. .......................... 333/22 R; 326/30
[58] Field of Search ................... 326/30; 333/1, 333/12, 22 R, 32

[56] References Cited

U.S. PATENT DOCUMENTS

| | | | |
|---|---|---|---|
| 4,859,877 | 8/1989 | Cooperman et al. | 326/30 |
| 5,120,909 | 6/1992 | Kutz et al. | 326/30 X |
| 5,208,562 | 5/1993 | Schirm, IV | 333/22 R |
| 5,239,559 | 8/1993 | Brach et al. | 326/30 X |

FOREIGN PATENT DOCUMENTS

| | | | |
|---|---|---|---|
| 3406671 | 8/1985 | Germany | 333/12 |

OTHER PUBLICATIONS

Gopalan et al., "An Optimized Active SCSI Termination Technique"; *Silicon Valley Personal Computer Design Conference (SVPC '93) Proceedings*, vol. II, Jul. 20–22, 1993, Santa Clara, CA; ed. Kenneth Majithia, Maple Press, pp. 339–344.

Cases et al., "Multifunctional Diode Terminator Network"; *IBM Technical Disclosure Bulletin*, vol. 21, No. 5, Oct. 1978, pp. 1881–1882.

*Primary Examiner*—Benny Lee
*Assistant Examiner*—Barbara Summons
*Attorney, Agent, or Firm*—Limbach & Limbach L.L.P.

[57] ABSTRACT

Reflections and cross talk in a high-speed, bidirectional transmission line are minimized by terminating the transmission line with a network including a "serial" resistor connected in series between an end of the transmission line and a parallel (e.g. data) port, a "pull-up" resistor connected to the transmission line side of the serial resistor, and a capacitor connected between the parallel port side of the serial resistor and ground. Optionally, a diode is connected between the pull-up resistor and a bias potential. A variety of exemplary values for these components (i.e., serial resistor, pull-up resistor, capacitor) are discussed, in the context of particular signals. Preferably, the capacitor and the resistors are positioned as close as possible to the connector.

33 Claims, 4 Drawing Sheets

TERMINATION CIRCUIT FOR COMPUTER PARALLEL DATA PORT

TECHNICAL FIELD OF THE INVENTION

The invention relates to digital data transmission and, more particularly, to termination circuits for digital data transmission lines, especially for parallel digital data transmission.

BACKGROUND OF THE INVENTION

Personal computers commonly exchange data with computer peripherals and/or other computers over interfaces having a byte-wide (8-bit wide) or wider data path. Such interfaces are commonly known as "Parallel Ports". Parallel ports, especially those commonly known as "Centronics" parallel ports, have been in wide use for many years primarily as a relatively high-speed (as compared to most serial transmission schemes) interface to peripheral devices such as printers. Early versions of such parallel port interfaces were uni-directional, permitting the computer to send data to the peripheral device (or other equipment at a receiving end of the interface), but not to receive data. Later variations on the basic parallel port were devised to support bi-directional communications with such varied devices as scanners, external disk drives, etc.

As new applications for parallel ports have arisen, particularly those applications requiring high data transmission rates and/or bi-directional communication, transmission speed requirements of parallel port interface circuitry have increased steadily. This has become particularly true since the preliminary release of IEEE (Institute of Electrical and Electronics Engineers) Standard Number P1284 "Standard Signalling Method for A Bi-direction Parallel Peripheral Interface for Personal Computers", Enhanced Parallel Port (EPP), and Extended Capabilities Port (ECP) protocols. The new standards define hardware-controlled protocols for a byte-wide parallel interface which can yield data rates of up to 2 Mbytes/second (which translates to 2 million data transfers per second, over a byte-wide data path).

Control signals in the IEEE P1284 interface connect directly to hardware state machines, leaving the state machines susceptible to any control signal noise. Such noise, by causing misoperation of the state machines, can cause data transfer errors across the parallel interface, thereby corrupting data exchanged across the interface. Compared to earlier, relatively lower speed parallel port specifications, the high data rates specified by the IEEE P1284 standard increase the risk of signal echoes (reflections) and cross-talk (induced signals on a signal wire by inductive coupling to high-speed signals on neighboring signal wires). Whereas designers of earlier, low-speed parallel ports were able to ignore transmission line characteristics of parallel port cabling, higher data rates require more complete consideration of signal propagation characteristics and electrical characteristics of interface cables.

To complicate matters further, manufacturers of computer systems and peripherals must concern themselves with EMI (Electro-Magnetic Interference) emissions. High-speed signals of the type which may be present on parallel port wiring tend to radiate RF (Radio Frequency) emissions which are capable of interfering with television and radio reception. Many standards organizations limit permissible RF emissions to below certain pre-specified levels.

In order to comply with RF/EMI emissions standards, and to minimize cross-talk and signal reflections, careful design of termination networks at either end of parallel interfaces is necessary. Prior-art termination techniques, as typified by termination networks specified in IEEE specification P1284, can produce signal reflections and cross-talk levels which substantially limit parallel port performance and interface cable length.

FIG. 1 is a schematic diagram of a prior-art transmission line communication circuit 100 as recommended By the IEEE P1284 specification for parallel ports. The circuit 100 provides communication between a transmitter 110 and a receiver 120 over a transmission line 130. The transmission line 130 represents one of a plurality of wires interconnecting a like plurality of transmitters and receivers (of which transmitter 110 and receiver 120 are representative) in a parallel port interface. The transmitter 110 is connected to a first end 132 of the transmission line 130 by a serially connected resistor 112. At the first end 132 of the transmission line 130, a termination capacitor 114 is connected to a ground in equipment containing the transmitter 110. A pull-up resistor 116 is connected between the first end 132 of the transmission line 130 and a power supply $V_{cc}$ (Transmit) of the equipment containing the transmitter 110. The receiver 120 is connected to a second end 134 of the transmission line 130 by another serially connected resistor 122. At the second end 134 of the transmission line 130, another termination capacitor 124 is connected to a ground in equipment containing the receiver 120. Another pull-up resistor 126 is connected between the second end 134 of the transmission line 130 and a power supply $V_{cc}$ (Receive) of the equipment containing the receiver 120. The resistor 112, resistor 116 and capacitor 114 represent a transmitter end termination network (circuit) 102, shown in dashed lines. The resistor 122, resistor 126 and capacitor 124 represent a receiver and termination network (circuit) 104, shown in dashed lines.

As is well known to those of ordinary skill in the art, inductive coupling between adjacent or closely spaced signal wires can produce cross-talk signals, and the greater the high-frequency content of the signals in closely spaced signal wires, the greater the potential for cross talk therebetween.

Signal currents in a wire are directly proportional to magnetic flux magnitude surrounding the wire. It has been well established that a voltage induced in a wire by changing magnetic flux is expressed by $V=d\Phi/dt$, where V is the induced voltage and $\Phi$ is the magnetic flux density. In a parallel port interface cable, adjacent signal wires can experience significant inductive coupling due to varying magnetic flux. (It is this same magnetic flux which produces EMI). However, since the induced voltage is proportional only to the time derivative of magnetic flux density, it is evident that DC and low-frequency signal currents have no significant effect on inductively coupled cross-talk while higher-frequency signal currents can have a very great effect on inductively coupled cross talk.

One technique for minimizing cross talk in parallel signal wires is to limit the slew rate of signal transitions. In the communication circuit 100, this is accomplished by using the two termination capacitors 114 and 124 to slow down signal edges generated by the transmitter 110.

However, it is also well known to those of ordinary skill in the art that transmission lines have a characteristic impedance, and that matching of the characteristic impedance is crucial to minimizing signal reflections in transmission lines. The termination capacitors 114 and 124 have an impedance which varies greatly with frequency. At DC, the capacitors 114 and 124 appear as open circuits. However, at higher frequencies, the capacitors appear as short circuits. At frequencies where the termination circuits (including resistors 112 and 116 and capacitor 114 for the transmitter 110; including resistors 122 and 126 and capacitor 124 for the receiver 120) do not match the characteristic impedance of the transmission line, reflections of the transmitted signals can occur. At low frequencies, where the capacitors 114 and 124 appear as open circuits, the reflections are positive in polarity with respect to the transmitted signal. At high frequencies, where the capacitors 114 and 124 appear as short circuits, the reflections are negative in polarity with respect to the transmitted signal.

Although the reflections are significantly attenuated in the transmission line 130 after a few "bounces", they limit the speed at which the communication circuit 100 can operate, and limit the maximum length of the transmission line 130. (Longer transmission lines require more time per "bounce", thereby increasing the time required for reflections to settle out).

Thus, there is a need for a termination technique which improves overall cross talk and reflection characteristics of transmission lines while limiting EMI. Such a technique would permit greater data transmission speeds and longer interface cables.

It is, therefore, an object of the present invention to provide a technique for terminating transmission line circuits in parallel port interfaces which reduces signal reflections as compared to prior-art techniques.

It is a further object of the present invention to provide a technique for terminating transmission line circuits in parallel port interfaces which reduces cross talk between adjacent signal leads as compared to prior-art techniques.

It is a further object of the present invention to provide a technique for terminating transmission line circuits in parallel port interfaces which exhibits low EMI and RFI emissions.

It is a further object of the present invention to provide a technique for terminating transmission line circuits in parallel port interfaces which permits greater cable lengths than prior-art techniques.

According to the invention, a transmission line is terminated by a "serial" resistor, connected in series between an end of the transmission line and a data port. A "pull-up" resistor is connected to the transmission line side of the serial resistor, and a pull-up voltage is applied thereto. A capacitor is connected between the data port side of the serial resistor and ground. Optionally, a diode is connected between the pull-up resistor and a bias potential. A variety of exemplary values for these components (i.e., serial resistor, pull-up resistor, capacitor) are set forth hereinbelow. Preferably, the capacitor and the resistors as positioned as close as possible to a connector of the port. The invention is particularly beneficial in the context of high-speed, bi-directional transmission lines, such as are specified by IEEE P1284 ("P"=provisional).

According to an aspect of the invention, when applied to computer parallel port interfaces such as a "Centronics" type interface, or an EPP or ECP interface, in equipment having a 3.3V power supply, exemplary component values are as follows (signal names conform to those in common use for these interface types):

On data transfer lines (PD0–7), the serial resistor value is 22 Ohms, the capacitor value is 220 pf (picofarads), and the pull-up resistor value is 4,700 Ohms for single connections, or 1,000 Ohm, where multiple external devices may be connected (MUX support).

On STB~, AFD~, and SLIN~ signal lines, the serial resistor value is 22 Ohms, the capacitor value is 220 pf, and the pull-up resistor value is 4,700 Ohms.

On ACK~ and BUSY signal lines, the serial resistor value is 100 Ohms, the capacitor value is 680 pf, and the second resistor value is 4,700 Ohms.

According to another aspect of the invention, when applied to computer parallel port interfaces such as a "Centronics" type interface, or an EPP or ECP interface, in equipment having a 5V (five volt) power supply, termination component values are as follows (signal names conform to those in common use for these interface types):

On data transfer lines (PD0–7) the serial resistor value is 33 Ohms, the capacitor value is 470 pf, and the pull-up resistor value is 4,700 Ohms for single connections, or 1,000 Ohms where multiple external devices may be connected (MUX support).

On STB~, AFD~, and SLIN~ signal lines, the serial resistor value is 33 Ohms, the capacitor value is 330 pf, and the pull-up resistor value is 4,700 Ohms.

On ACK~ and BUSY signal lines, the serial resistor value is 100 Ohms, the capacitor value is 680 pf, and the pull-up resistor value is 4,700 Ohms.

These values are intended to be exemplary, and not limiting, and are chosen to optimize performance and to minimize cost for the signal lines to which they are applied, based on standard cable, driver and receiver characteristics.

In so-called "multiplex" applications wherein a multidrop network is created by connecting multiple devices along a parallel "bus", the pull-up resistor value may be lowered from 4,700 Ohms to 1,000 Ohms for data bus signals (PD0–7) to overcome additional capacitances and leakages along the transmission line due to the greater number of connected devices.

Generally, signals such as ACK~ and BUSY, which occur only sporadically (i.e., infrequently during a data transmission), and which typically are generated in the peripheral equipment at the receive end of the transmission line have larger capacitances associated therewith (i.e., in the termination network) and serial resistor values to smooth the signals and to help filter out unwanted noise.

PE, SLCT, and ERR~ signals are "static" status signals for which cross talk and reflections are not a significant problem, and can readily be terminated without a termination network.

By applying a capacitor directly to the transmitter output, rather than at the transmit end of the transmission line (as in the prior-art techniques), secondary incident waves (reflections off of the transmit end of the transmission line of reflected waves originating at the receive end of the transmission line) are greatly reduced, improving noise performance of the transmission line. Further, by applying a capacitor at the receiver input rather than at the receive end of the transmission line (as in the prior-art techniques), reflected waves (first signal reflections off the receive end of the transmission line) are also greatly reduced. By using the inventive technique, signals propagate along the transmission line much more cleanly than for the prior-art techniques.

Further, as long as the current drive capability of the transmitter output is low enough that the capacitor at the transmitter output limits the slew rate of the transmit signal, cross talk between adjacent signal lines is also reduced, in part due to the slew-rate limiting, and in part due to reduced reflections.

Other objects, features and advantages of the present invention will become evident in light of the following description thereof.

BRIEF DESCRIPTION OF THE DRAWINGS

Reference is made hereinbelow to referred embodiments of the invention, examples of which are illustrated in the accompanying drawings. Although the invention will be described in the context of these preferred embodiments, it should be understood that it is not intended to limit the spirit and scope of the invention to these particular embodiments.

DETAILED DESCRIPTION OF THE INVENTION

The present invention employs a transmission line termination technique in which a capacitor is connected directly at an output terminal of a transmission line driver (transmitter) circuit, prior to and in series with resistive termination of a transmit end of a transmission line. In a similar manner, capacitive termination is applied directly to an input terminal of a receiving circuit (receiver). A series terminating resistor ("serial resistor") is connected between the input terminal of the receiver and a receiving end of the transmission line.

Figure 2A:
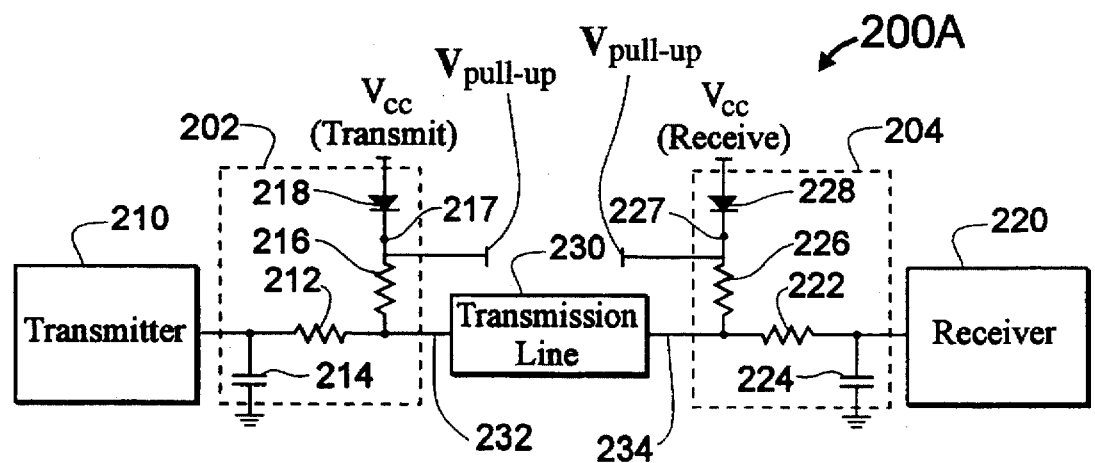
FIG. 2A is a block diagram of a communication system employing a transmission line terminated according to one embodiment of the present invention.

FIG. 2A is a schematic diagram of a communication system 200A terminated according to the present invention. The communication system includes a transmitter 210 and a receiver 220, communicating over a transmission line 230. A transmit end 232 of the transmission line 230 connects to an output terminal of the transmitter 210 via a first termination network 202, and a receiving end 234 of the transmission line 230 connects to an input terminal of the receiver 220 via a second termination network 204.

The first (transmitter) termination network includes a "serial" resistor 212, a "pull-up" resistor 216, a capacitor 214, and a diode 218. The serial resistor 212 is connected between the output terminal of the transmitter 210 and the transmit end 232 of the transmission line 230. The capacitor 214 is connected from the output terminal of the transmitter 210 to ground.. The pull-up resistor 216 is connected between the transmit end 232 of the transmission line 230 and a cathode end of a diode 218. An anode end of the diode 218 connects to a power supply voltage ($V_{cc}$(transmit)) in equipment containing the transmitter 210. A junction between the pull-up resistor 216 and the diode 218 is identified in the figure as element 217.

The second (receiver) termination network 204 includes a serial resistor 222, a pull-up resistor 226, a capacitor 224 and a diode 228. The serial resistor 222 is connected between the output terminal of the receiver 220 and the receive end 234 of the transmission line 230. The capacitor 224 is connected from the input terminal of the receiver 220 to ground. The pull-up resistor 226 is connected between the receive end 234 of the transmission line 230 and a cathode end of a diode 228. An anode end of the diode 228 connects to a power supply voltage ($V_{cc}$(receive)) in equipment containing the receiver 220. A Junction between the pull-up resistor 226 and the diode 228 is identified in the figure as element 227.

The main purpose of the diodes (218, 228) is to prevent steady-state current flow between $V_{cc}$(transmit) and $V_{cc}$ (receive). For example, in a case where the equipment containing the transmitter (e.g., a notebook computer) is powered on, but a peripheral device containing the receiver (e.g., a printer) at the other end of the transmission line is powered off, it is possible for current to flow between the transmitter's power supply and the receiver's power supply. This is particularly undesirable in battery powered equipment where battery conservation is of paramount importance. Further, it is not uncommon for two pieces of equipment interconnected by a parallel interface cable to operate at different power supply voltage levels. For example, many modern notebook computers operate on a 3.3V supply. If such a computer is connected to a printer which operates on a 5 Volt supply, then the termination network shown in FIG. 1 would permit current to flow between the power supplies, even when both computer and printer are powered on.

Preferably, the diodes 218 and 228 are "Schottky" diodes to provide low voltage drop and high switching speed. Pull-up voltages may be applied at the Junctions 217 and 227 (i.e, at the cathode ends of the diodes 218 and 228, respectively) which are one diode drop lower than the respective power supply ($V_{cc}$) Voltages applied to the anode ends of the diodes 218 and 228, respectively. The use of pull-up voltages is optional, but is significant in the context of low voltage (e.g., 3.3 Volt) systems such as notebook computers, wherein it is necessary to minimize the voltage loss (drop) across the diodes.

Where current flow across the parallel interface cable is not a concern, however, it is possible to eliminate the diodes 218 and 228, connecting the pull-up resistors 216 and 226 directly to their respective supply voltages ($V_{cc}$), Such an arrangement is described hereinbelow with respect to FIG. 2B.

Figure 2B:
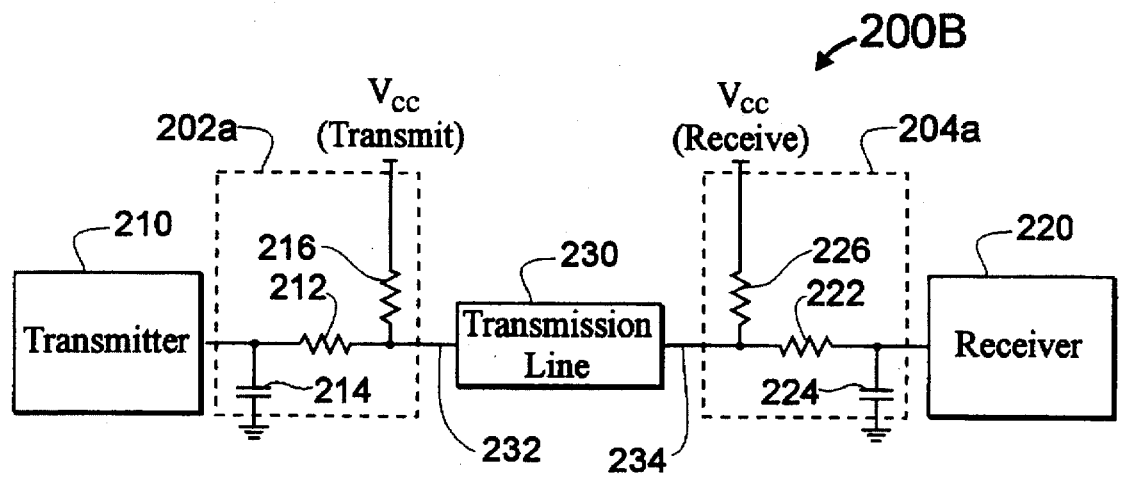
FIG. 2B is a block diagram of a communication system employing a transmission line terminated according to another embodiment of the present invention.

FIG. 2B is a schematic diagram of a communication system 200B employing another embodiment of the termination network of the present invention. The communication system 200B is identical to the communication system 200A except that the two diodes 218 and 228 are omitted. In the communication system 200B, the pull-up resistor 216 connects directly to the power supply voltage in the equipment containing the transmitter 210, and the pull-up resistor 226 connects directly to the power supply voltage in the equipment containing the receiver 220. The diodes 218 and 228 in communication system 200A shown in FIG. 2A are effectively replaced with short circuits in the communication system 200B shown in FIG. 2B. The resistor 212, resistor 216 and capacitor 214 represent a transmitter end termination network (circuit) 202a, shown in dashed lines. The resistor 222, resistor 226 and capacitor 224 represent a receiver end termination network (circuit) 204a, shown in dashed lines.

In order to more fully understand the characteristics of the present invention and to establish a standard terminology for further discussion, it is necessary to review the basic theory of incident and reflected waves in a transmission line and the mechanisms of cross talk in parallel wires.

A transmission line is essentially a wired connection between two points. For uni-directional communication, these two points will be respectively called a "transmit end" of the transmission line and a "receive end" of the transmission line. In uni-directional communication, a signal is applied to the transmit end of the transmission line by a transmitter and is received at the receiving end of the transmission line by a receiver. Those of ordinary skill in the art will immediately appreciate that in bi-directional communication, there are transmitters and receivers at both (i.e., transmit and receive) ends of the transmission line, which blurs the distinction of one end being a transmit end and the other end being a receive end. However, for purposes of this discussion, the behavior of signals propagating in one direction (i.e., from the transmit end to the receive end) over the transmission line are sufficiently illustrative.

A signal applied at the transmit end of the transmission line propagates along the transmission line until it reaches the receive end of the transmission line. The signal creates a waveform at the transmit end of the transmission line which will be referred to hereinafter as an "incident wave". The transmission line has a characteristic impedance $Z_0$. If the receiving end of the transmission line is terminated with a load impedance $Z_L$ which exactly matches the characteristic impedance $Z_0$, then the incident wave will completely be absorbed at the receive end of the transmission line. If, however, there is any mismatch between the load impedance $Z_L$ and the characteristic impedance $Z_0$ (which is more representative of the typical situation, in practice), then the incident wave will not be completely absorbed, and the un-absorbed portion of the incident wave will be reflected back toward the transmitter in what will be referred to hereinafter as a "reflected wave".

In a similar manner, the reflected wave travels back along the transmission line until it reaches the transmit end of the transmission line. A terminating source impedance $Z_S$ at the transmit end of the transmission line will, vis-a-vis the reflected wave, behave much like the load impedance $Z_L$ at the receive end of the transmission line, in that if there is any mismatch between the source impedance $Z_S$ and the characteristic impedance $Z_0$, then an unabsorbed portion of the reflected wave is reflected back toward the receiver as a secondary incident wave. At each end of the transmission line, absorption of signal energy by the termination impedances $Z_L$ and $Z_S$ reduces the amplitude of each reflection until after some number of reflections, the amplitude of the reflected waves and secondary incident waves becomes negligible and the transmission line reaches a steady state condition. Each absorption of signal energy at each end of the transmission line will be referred to hereinafter as an "adjustment" of the signal waveform (incident or reflected).

The number of cycles required to reach a steady state can be kept to a minimum by controlling how the termination circuits of the transmitter and the receiver "adjust" (react to) the voltage and current of the signal waveforms. Ideally, as mentioned above, all of the signal energy would he completely absorbed at the receiving end, and the steady state would be reached in a single cycle, without reflections. According to the aforementioned. IEEE P1284 standard, the "ideal" case is, for example, when a signal having an "attenuated" magnitude $V_{cc}/2$ is transmitted, due to a voltage divider effect between $Z_0$ and $Z_S=(R_S+R_0)$. When such a signal reaches an open-ended receiver, it would be transmitted back (reflected), and since $Z_S=Z_0$ (in this example), the reflected signal would be completely absorbed at the transmitter, and a steady state would quickly be achieved.

When there is no loss in a transmission line, Equation 1 and Equation 2 below describe signal voltage and current, respectively, at any position x along a transmission line at any time t. These equations are known as the telegraphic equations.

$$V(x,t) = f_i\left(t - \frac{x}{u}\right) + f_r\left(t + \frac{x}{u}\right) \quad (1)$$

$$I(x,t) = \frac{\left[f_i\left(t - \frac{x}{u}\right) + f_r\left(t + \frac{x}{u}\right)\right]}{z_0} \quad (2)$$

where:

$f_i$ is the sum of all incident waves from the transmitter in the forward direction (i.e., from transmit end to receive end)

$f_r$ is the sum of all reflected waves from the receive end in the reverse direction (i.e., from receive end to transmit end)

u is the velocity of the wave in the transmission line $z_0$ is the characteristic impedance of the transmission line, and x is a position on the transmission line measured from the transmit end In order to simplify further analysis, the transmission line can be deemed to be one unit in length such that $0 \leq x \leq 1$.

To find the voltage and current in the transmission line as a function of position (x) and time (t), the voltage and current at the transmit end of the transmission line (x=0) and at the receive end of the transmission line (x=1) must be calculated.

As implied by the discussion hereinabove, it can be assumed that the transmission line is driven at the transmit end by a voltage source having a series internal impedance of $Z_S$ and that the transmission line is terminated at the receive end by a load impedance $Z_L$.

Since digital signals transmitted over a transmission line are generally a zero-to-one transition of a binary signal, it is reasonable to model a single transition as a unit step with a magnitude equal to a known voltage. In the case of parallel ports, an ideal zero-to-one transition would be a change from a 0 volt condition to a voltage equal to a power supply voltage $V_{cc}$ (usually 5 volts). Equation 3, set forth hereinbelow, describes such a voltage source $V_S(t)$.

$$V_S(t) = V_{cc} \times \mu(t) \quad (3)$$

where $\mu(t)$ is a unit step function which is equal to zero for t<0 and which is equal to 1 for t>0.

The case where both source and termination impedances are purely resistive can be examined, such that $Z_S=R_S$ and $Z_L=R_L$, where $R_S$ and $R_L$ are pure resistances.

Initially, the transmission line is in a steady state condition. At time t=0, the transmitter applies the voltage source $V_S(t)$ described in Equation 3 set forth hereinabove to the transmit end of the transmission line through the source termination resistance $R_S$ producing an incident voltage waveform V(0,t) at the transmit end of the transmission line, as described by Equation 4 set forth hereinbelow. The incident voltage waveform propagates along the transmission line until it reaches the receive end at t=1/u. Hereinafter, the signal travel time from one end of the transmission line to the other will be referred to as $T_D$. For any time $t<T_D$, the voltage waveform at any position x along the transmission line is given by Equation 5 set forth hereinbelow.

$$V(0,t) = V_{cc} \times \mu(t) \times \frac{z_0}{z_0 + R_S} \quad (4)$$

$$V(x,t) = f_i\left(t - \frac{x}{u}\right) = V_{cc} \times \mu\left(t - \frac{x}{u}\right) \times \frac{z_0}{z_0 + R_S} \quad (5)$$

When the incident wave reaches the receive end (x=1) a reflected wave is generated. (As mentioned above, the reflected wave is due to imperfect absorption of the incident wave at the receiver.) The voltage V(1,t) at the receive end of the transmission line is given by Equation 6, set forth hereinbelow. The portion of the waveform which is not absorbed at the receive end of the transmission line is reflected back towards the transmit end as a reflected wave. The reflected waveform $f_r(t)$ is described by Equation 7, set forth hereinbelow.

$$\begin{aligned} V(1,t) &= 2 \times f_i\left(t - \frac{1}{u}\right) \times \frac{R_L}{R_L + z_0} \quad (6) \\ &= 2 \times V_{cc} \times \mu\left(t - \frac{1}{u}\right) \times \frac{z_0}{z_0 + R_S} \times \frac{R_L}{R_L + z_0} \end{aligned}$$

$$\begin{aligned} f_r\left(t + \frac{1}{u}\right) &= V(1,t) - f_i\left(t - \frac{1}{u}\right) \quad (7) \\ &= f_i\left(t - \frac{1}{u}\right) \times \frac{R_L - z_0}{R_L + z_0} \\ &= f_i\left(t - \frac{1}{u}\right) \times \Gamma_r \end{aligned}$$

$$\Gamma_r = \frac{R_L - z_0}{R_L + z_0} \quad (8)$$

where $\Gamma_r$, described by Equation 8 is known as the "reflection factor" for the receive end of the transmission line.

The reflected wave now propagates back toward the transmit end of the transmission line, and its value at each point along the transmission line is described in Equation 9, set forth hereinbelow. At time $t=2T_D$ the reflected wave reaches the transmit end and encounters the source termination resistance ($R_S$) and a reflection off the transmit end of the transmission line produces a secondary incident wave $f_{i1}$, described in Equation 10, below.

$$f_r\left(t + \frac{x}{u}\right) = V_{cc} \times \mu\left(t - 2\frac{1}{u} + \frac{x}{u}\right) \times \frac{z_0}{z_0 + R_S} \times \Gamma_r \quad (9)$$

$$f_{i1}\left(t - \frac{x}{u}\right) = V_{cc} \times \mu\left(t - 2\frac{1}{u} - \frac{x}{u}\right) \times \frac{z_0}{z_0 + R_S} \times \Gamma_r \times r_i \quad (10)$$

$$\Gamma_i = \frac{R_S - z_0}{R_S + z_0} \quad (11)$$

where $\Gamma_i$ is the reflection factor for the transmit end of the transmission line. This new incident wave (secondary incident wave) reflected by the transmitter propagates back toward the receive end, and the entire process is repeated until a steady state is achieved.

In examining the reflection factors ($\Gamma$) for the transmit and receive ends of the transmission line, it is evident that when the terminating impedance is infinite (i.e., open circuit), there is full reflection. For example, if $R_L=\infty$, the $\Gamma_r=1$.

If there is a perfect match between the terminating impedance and the characteristic impedance of the transmission line (e.g., $Z_0=R_L$) then reflections are completely suppressed (i.e, $\Gamma_r=0$).

If the terminating impedance is a short circuit, (e.g., $R_L=0$) then there is complete reflection with negative polarity (i.e., $\Gamma_r=-1$).

If a capacitor having a capacitance value C (typically measured in picofarads) is connected between the receive end of the transmission line and ground parallel to $R_L$, Equation 12, set forth hereinbelow, describes the reflected wave.

$$f_r\left(t + \frac{x}{u}\right) = \quad (12)$$

$$V_{cc} \times \mu\left(t - 2\frac{1}{u} + \frac{x}{u}\right) \times \frac{z_0}{z_0 + R_S} \times$$

$$\left(\frac{R_L - z_0 - 2R_L e^{-\left[\frac{t - 2\frac{1}{u} + \frac{x}{u}}{\tau}\right]}}{R_L + z_0}\right)$$

At time $t=2((1/u)-(x/u))$, which is the time it takes the reflected wave $f_s$ to arrive at point x, the value of $\Gamma_s$, is $-1$, and when $t \rightarrow \infty$, the value of $\Gamma_s$ is the same as is calculated by Equation 8; that is, for high frequency components of transmission line signals (or for short-term time analysis) the capacitor appears as a short circuit. For DC and low-frequency components, the impedance of the capacitor is high and has no significant effect on the resistive termination. This means that for high frequency components of the transmission line signals (incident and reflected waves) there is almost total reflection with negative polarity. Slow (low-frequency) components of the transmission line signals, however, behave much as they did in the case of purely resistive termination.

For purposes of the present invention, it is important to consider the case where a CMOS (Complementary Metal Oxide Silicon) buffer drives a transmission line through a series-connected source termination resistor $R_S$ and a CMOS input is connected directly to the receiving end of the transmission line. In such a case, the transmit end of the transmission line "appears" (behaves as) to be driven by a voltage source with a series impedance, and the receive end "appears" to be almost an open circuit, since CMOS inputs tend to have extremely high input impedance. If perfect impedance matching is assumed to exist between the transmission line and the source termination, then $R_S=Z_0$. Because of the high impedance of the CMOS input circuit at the receive end, an open circuit can be assumed, (i.e., $R_L \rightarrow \infty$). It can further be assumed that there are no other termination components applied to the transmit and receive ends of the transmission line. For this case, the incident and reflected waves are described by Equations 13 and 14, set forth hereinbelow, respectively.

$$f_i(t) = V_{cc} \times \mu(t) \times \frac{z_0}{z_0 + R_S} = 0.5 \times V_{cc} \times \mu(t) \quad (13)$$

$$f_r(t) = V_{cc} \times \mu\left(t - \frac{1}{u}\right) \times \frac{z_0}{z_0 + R_S} = 0.5 \times V_{cc} \times \mu\left(t - \frac{1}{u}\right) \quad (14)$$

The reflection described by Equation 14 occurs because when an incident wave (step function) with amplitude $V_{cc}/2$ reaches a load $R_L \rightarrow \infty$, it is completely reflected, effectively doubling the voltage seen at the receive end of the transmission line ($v(1,T_D)=V_{cc}$), and a reflected wave with the value $V_{cc}/2$ is propagated back to the transmitter. At the transmitter, there is perfect matching. Therefore, there is no reflection from the transmit end of the transmission line back toward the receive end, no secondary incident wave, and the transmitter finishes the transaction in a single cycle with $v(0,t)=V_{cc}$.

Next, two different cases are considered where there is a CMOS driver circuit connected to the transmit end of the transmission line by an RC (resistor/capacitor) circuit, and where the receive end of the transmission line is an open circuit.

In the first of these cases (capacitor at transmit end of transmission line), a series resistor is connected between the output of a CMOS buffer and the transmit end of the transmission line.. A capacitor is connected between the transmit end of the transmission line and ground. The series resistor between the CMOS buffer and the transmit end of the transmission line is chosen so that the sum of the internal resistance of the CMOS buffer and the series resistance equals the characteristic impedance $Z_O$ of the transmission line. The load resistor at the receive end of the transmission line is also chosen to match the characteristic impedance $Z_0$.

The capacitor has a capacitance value C and is connected in the termination network in order to reduce the slope of the incident wave at the transmit end of the transmission line, thereby reducing EMI (Electro-Magnetic Interference) and cross talk. Cross talk characteristics of transmission lines are discussed in greater detail, hereinbelow.

With the capacitor at the transmit end of the transmission line, there is no direct capacitive load on the output of the CMOS buffer. Therefore, $V_{out}$ changes immediately and the buffer operates in a linear mode, where it appears as a Voltage source with internal resistance $R_0$.

The first incident and reflected waves and the second incident wave for this termination configuration are calculated by Equations 15, 16, and 17, set forth hereinbelow, respectively, where:

$$Z = Z_0,$$
$$R = R_S + R_D, \text{ and}$$
$$\tau = R \, Z \, C/(R+Z)$$

$$f_i(t) = V_{cc} \times \mu(t) \times \frac{Z}{Z+R} \times (1 - e^{-\frac{t}{\tau}}) \quad (15)$$

$$f_r(t) = V_{cc} \times \mu(t) \times \frac{Z}{Z+R} \times (1 - e^{-\frac{t}{\tau}}) \quad (16)$$

$$f_{i1}(t) = V_{cc} \times \mu(t) \times \quad (17)$$

$$\left( \frac{Z}{Z+R} \times \frac{R-Z}{R+Z} - \frac{1}{R+Z} \times \left( \frac{Z \times (R-Z)}{R+Z} + 2\frac{t}{\tau} \right) \times e^{-\frac{6}{\tau}} \right)$$

Equations 15 and 16 show that the reflected waves are exponential, while the secondary incident wave is more complex. The secondary incident wave $f_{i1}$ starts from zero, reaches a peak value, and at $t \to \infty$, has a form in accordance with Equation 10.

In the second case (capacitor at output of CMOS buffer), the CMOS buffer is connected to the transmit end of the transmission line, as before, but the capacitor is connected between the output of the CMOS buffer and ground, rather than between the transmit end of the transmission line and ground, as in the first case. As a result, the capacitor is separated from the transmit end of the transmission line by the series source termination resistor $R_S$ and the termination impedance seen at the transmit end of the transmission line is primarily resistive.

In this configuration, the output $V_{out}$ of the CMOS buffer is prevented from changing rapidly. The CMOS buffer becomes saturated almost immediately and charges the capacitor at a constant current, appearing as a current source. When the CMOS buffer finally enters its linear mode of operation, it appears as a voltage source with an internal resistance $R_D$ in the previous case. As a result, the first incident wave, which is produced with the CMOS buffer acting as a current source, has one time constant $\tau$ while the secondary incident wave, which is produced with the CMOS output buffer acting as a voltage source, has a second time constant $\tau_1$.

The first incident wave $f_i$, the reflected wave $f_r$, and the secondary incident wave $f_{i1}$, for this second case are described by Equations 18, 19, and 20, respectively, where $Z=Z_0+R_S$, $R=R_D$, and $\tau_1=R\,Z\,C/(R+Z)$.

$$f_i(t) = V_{cc} \times \mu(t) \times \frac{Z_0}{Z+R} \times (1 - e^{-\frac{t}{\tau}}) \quad (18)$$

$$f_r(t) = V_{cc} \times \mu(t) \times \frac{Z_0}{Z+R} \times (1 - e^{-\frac{t}{\tau}}) \quad (19)$$

$$f_{i1}(t) = v_{cc} \times \mu(t) \times \frac{z_0}{z \times (z+R)} \times \quad (20)$$

$$\left( 2z_0 \times \left( \frac{R\tau}{R\tau + z\tau - cZR} - \frac{R}{R+Z} \right) \times \right.$$

$$\exp\left( -\frac{t}{\tau_1} \right) + z \times \frac{z + R - 2Z_0}{Z+R} -$$

$$\left. \left( \frac{2z_0 R\tau}{R\tau + 2\tau - cZR} + z - 2z_0 \right) \times \exp\left( \frac{t}{\tau} \right) \right)$$

Figure 3:
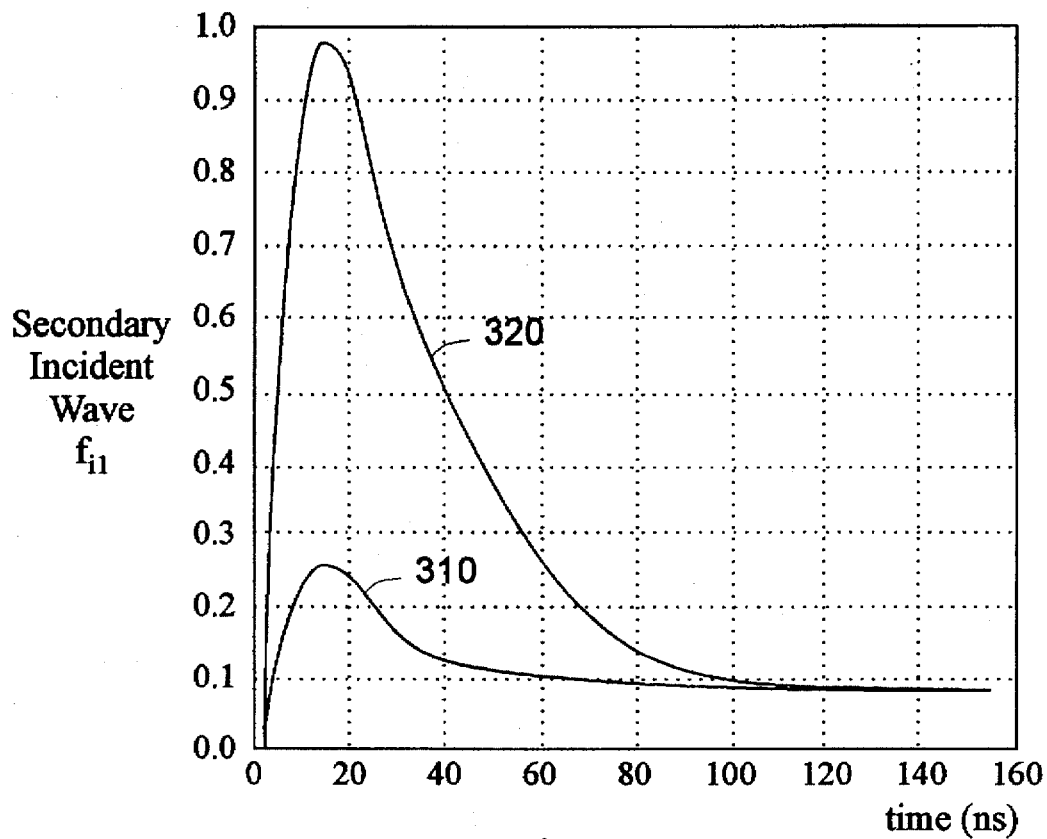
FIG. 3 is a graph illustrating the magnitude of a secondary incident wave ($f_{i1}$) for two cases where the capacitor is connected at the output of a CMOS buffer, and where the capacitor is connected at the transmit end of a transmission line (described below by Equation 17), and is illustrative of minimizing reflections in a transmission line, according to the present invention.

FIG. 3 is a graph showing the secondary incident wave $f_{i1}$ for the two cases where the capacitor is connected at the output of the CMOS buffer (described by Equation 20) and where the capacitor is connected at the transmit end of the transmission line (described by Equation 17). Trace 320 shows the case corresponding to Equation 17 and trace 310 shows the case corresponding to Equation 20.

As can be seen from the graph of FIG. 3, in the case where the capacitor is connected at the transmit end of the transmission line (trace 320), the peak amplitude of the secondary incident wave is higher than the case where the capacitor is connected at the output of the CMOS buffer (trace 310).

When the capacitor is connected at the transmit end of the transmission line, the reflected wave f, encounters a virtual short circuit (for high frequency components of the reflected wave) at the transmit end of the transmission line and as a result, a strong reflection occurs, thereby creating a substantial secondary incident wave. At the same time, when the capacitor is connected at the output of the CMOS buffer, the characteristic impedance of the transmission line is better matched by the termination components at the transmit end of the transmission line (due to the series resistor $R_S$), and the amplitude of the secondary incident wave is lower.

In both cases (capacitor at CMOS buffer output and capacitor at transmit end of transmission line), the reflected wave is not a step function. The capacitor does not behave as a "true" short circuit, and the reflections are somewhat smoother. In addition, as $t \to \infty$, both secondary incident waves have the same amplitude, because the capacitor has no effect in the steady state, and in both cases: $\lim \Gamma_r = (R_D + R_S - Z_0)/(P_D + R_S + Z_0)$ as $t \to \infty$.

To summarize the results of analysis of the two cases where the CMOS buffer drives the transmission line through an RC circuit, it should be noted, as follows:

When the capacitor is connected at the transmit end of the transmission line, the output buffer immediately begins operating in a linear mode. However, when the capacitor is connected at the output of the CMOS buffer, the buffer operates in a saturation mode (constant current). In this saturation mode, the output voltage has a linear slope, because the capacitor is charged with a constant current.

In both cases, the first incident wave and the first reflected wave have the same slopes.

The amplitude of the secondary incident wave is much higher when the capacitor is connected at the transmit end of the transmission line, as predicted by equations 17 and 20, and as shown in FIG. 3.

In both cases, the impedance of the transmitter is mismatched to the characteristic impedance of the transmission line. A receive-end mismatch causes the receive end reflected wave.

The discussion presented hereinabove has been directed principally to an analysis of reflections of signals propagating over a transmission line. Another matter of concern is cross talk between adjacent signal wires, and the effect of termination-on cross talk. It is assumed throughout the discussion hereinbelow with respect to cross talk that no special cabling or shielding is employed.

Figure 4:
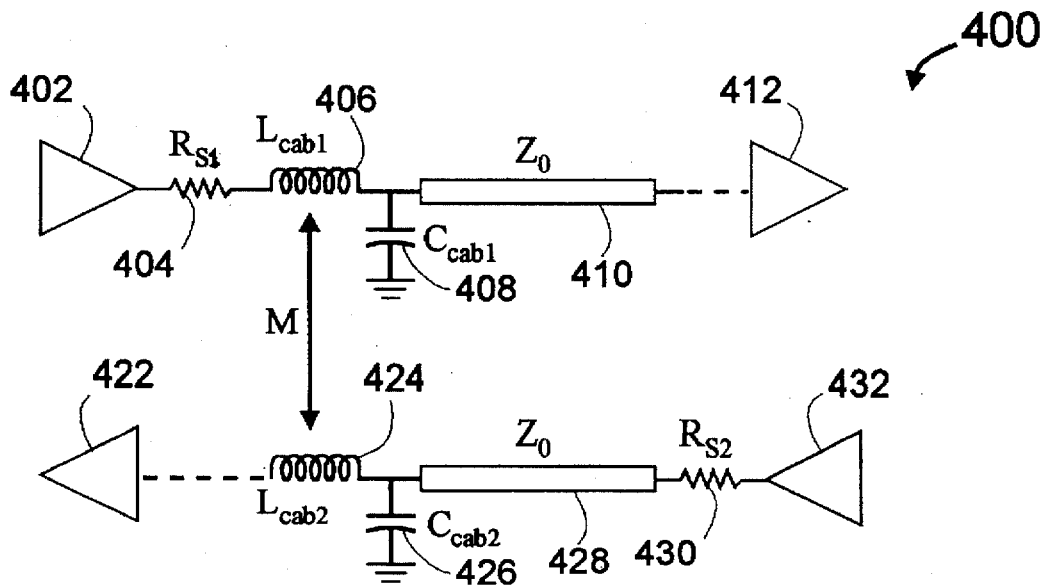
FIG. 4 is a schematic diagram of an equivalent circuit for a pair of adjacent wires in a cable, and is used in a discussion presented below of minimizing cross talk between the wires, according to the present invention.

FIG. 4 is a schematic diagram of an equivalent circuit 400 for a pair of adjacent wires in a cable. For purposes of discussion, it is assumed that the two wires are driven at opposite ends of the cable. This is comparable to the situation where a data line (wire) in a cable is driven by a computer at one end of a cable, while a status line (wire) is driven by a peripheral device at an opposite end of the cable. A buffer 402 drives a first of the adjacent wires through a first series termination resistor 404 ($R_{S1}$). The first wire is modelled in FIG. 4 as a first transmission line 410 having a characteristic impedance $Z_0$. Lumped inductive and capacitive parameters for the first transmission line 410 are modelled as a first inductor 406 ($L_{cab1}$) and a first capacitor 408 ($C_{cab1}$), respectively. At the receive end of the first transmission line 410, a receiver 412 receives the signal transmitted over the first transmission line 410 by the transmitter 402.

The second wire is driven by a second transmitter 432 through a second series termination resistor 430 $R_{S2}$. The second wire is modelled as a second transmission line 428 having a characteristic impedance $Z_0$ identical to that of the first transmission line 410 (as would ordinarily be the case in a cable having a plurality of identical wires), and lumped inductive and capacitive parameters are shown as a second inductor 424 ($L_{cab2}$) and a second capacitor 426 ($C_{cab2}$), respectively. A receiver 422 at the receive end of the second transmission line 428 receives a signal from the second transmission line 428. The first and the second transmission lines 410 and 428 are arranged such that the transmit end of the first transmission line 410 is at the same end of the cable as the receive end of the second transmission line 428 and vice versa. Inductive coupling between the two transmission lines 410 and 428 is indicated by a coupling factor labelled "M" between the two lumped inductances 406 ($L_{cab1}$) and 424 ($L_{cab2}$).

When a signal in one of the wires represented by the two transmission lines 410 and 428 changes, an incident wave resulting from the change causes current that passes through the wire to change, thereby inducing a voltage on the second wire known as a cross talk voltage. For example, a signal transmitted by transmitter 402 over the first transmission line 410 causes a change of current in the first 10 transmission line 410. The inductive coupling between the lumped inductances 406 and 424 induces a signal in the second transmission line 428. If the induced signal is large enough, it can cause the second receiver 422 to misinterpret the signal transmitted by the second transmitter 432, or to "identify" the cross-talk voltage as a signal being transmitted by the transmitter 432.

There are essentially two options (cases) for minimizing the cross talk voltage that reaches the input buffer—namely:

(1) Filter the voltage on $L_{cab2}$ (424), before it reaches the second receiver 422 using a simple RC filter between the transmission line and the second receiver 422; and (2) Minimize the gradient (rate of change) of the current that passes through $L_{cab1}$ (406).

Only the second option (2) is discussed herein, i.e., minimizing the current gradient. The two cases examined above with respect to reflections and capacitive terminations are re-examined for cross-talk characteristics. Both cases employ a serially connected resistor (e.g. 404, 430) between a transmit buffer (e.g., 402, 432) and the transmit end of a transmission line (e.g. 410, 428). The first case employs a capacitor connected between the transmit end of the transmission line and ground. The second case employs a capacitor connected at the output point from the buffer. Since the voltage pattern on $L_{cab2}$ is the same as on $L_{cab1}$, this document focuses on the circuit of signal1 and the effects of reducing the current's gradient.

Under conditions discussed hereinabove with respect to reflections, two adjustments (reflections) occur before the signal at the transmit end of the transmission line reaches a steady state. The first occurs when the transmit buffer transmits the first incident wave, and the second occurs after $2T_D$, when the reflected wave from the receiver reaches the transmitter and the secondary incident wave occurs.

The first adjustment is completely controlled at the transmit end of the transmission line, while the second is affected by the receive end (e.g., a capacitor at the receiver would change the slope of the second adjustment).

It is assumed that there is a capacitor at the receiver (an RC filter from the transmission line to the receiver). Consequently, the second transaction (reflected wave) is relatively smooth. As a result, the current gradient through the transmission line and the cross talk voltage are both low.

It will be understood by those of ordinary skill in the art that the signal voltage at $L_{cab1}$, in the first transmission line relates directly to the magnitude of an induced cross talk signal in the second transmission line. The amount of coupling depends upon a variety of factors including cable spacing, shielding, etc.

In a first case, a termination capacitor may be connected at the transmit ends of each of the transmission lines 410 and 428. (Note that the termination capacitor is not the same as the lumped capacitive parameters 408 and 426 ($C_{cab1}$ and $C_{cab2}$). It is assumed that the effect of the lumped capacitance in the following analysis is negligible.) That is, a first termination capacitor is connected between the first series termination resistor 404 ($R_{S1}$) and ground at the point of connection between the first series termination resistor 404 and the transmit end of the transmission line 410. A second termination capacitor is connected between the second series termination resistor 430 ($R_{s2}$) and ground, at the point of connection between the second series termination resistor 430 and the transmit end of the second transmission line 428. In this configuration, the transmit buffer 402 "sees" a substantially purely resistive load and immediately begins operation in a linear mode. This will cause the transmitter 402 to appear as a voltage source having a series internal resistance $R_D$. Equation 21, set forth hereinbelow, describes the voltage $V_L$ at the junction between the first termination resistor 404 ($R_{S1}$) and the transmit end of the first transmission line 410 (at inductor 406 $L_{cab1}$), Equation 22, set forth hereinbelow, is an approximate expression for this voltage, and Equation 23, set forth hereinbelow, gives the peak value of $V_L$. It is assumed that $R_{S1}=R_{S2}=R_S$, that $L_{cab1}=L_{cab2}=L$, and that the two termination capacitors are equal and have capacitance values C.

$$V_L(t) = \frac{2 \times V_{cc} \times L}{a} \times e^{-\left[\frac{Z_0 C \times (R_S + R_D) + L}{2LC \times (R_S + R_D)}\right]t} \times \sinh\left(\frac{at}{2LC \times (R_S + R_D)}\right) \quad (21)$$

where:

$$a = \sqrt{Z_0^2 C^2 \times (R_S + R_D)^2 - 2Z_0 CL \times (R_S + R_D) + L^2 - 4LC \times (R_S + R_S)^2}$$

$$V_L(t) = \frac{V_{cc} \times t}{C \times (R_S + R_D)} \times e^{-\left[\frac{Z_0 C \times (R_S + R_D) + L}{2LC \times (R_S + R_D)}\right]t} \quad (22)$$

$$V_{Lpeak} = \frac{2 \times V_{cc} \times L}{Z_0 C \times (R_S + R_D) + L} \times e^{-1} \quad (23)$$

In a second case, a termination capacitor may be connected at the outputs of each of the transmit buffers 402 and 432. (As before, note that the termination capacitor is not the same as the lumped capacitive parameters 408 and 426 ($C_{cab1}$ and $C_{cab2}$)). That is, a first termination capacitor is connected between the first series termination resistor 404 ($R_{S1}$) and ground at the point of connection to the output of the first transmit buffer 402. A second termination capacitor is connected between the second series termination resistor 430 ($R_{S2}$) and ground, at the point of connection the output of the second transmit buffer 432. In this configuration, the transmit buffer 402 "sees" a substantially capacitive load and immediately begins operation in a saturation mode. This will cause the transmitter 402 to behave as a constant current source. For this case, Equation 24, set forth hereinbelow, describes the voltage $V_L$ at the Junction between the first termination resistor 404 ($R_{S1}$) and the transmit end of the first transmission line 410 (at inductor 406 $L_{cab1}$). Equation 25, set forth hereinbelow, is an approximate expression for this voltage, and Equation 26, set forth hereinbelow, gives the peak value of $V_L$. As in the first case, it is assumed that $R_{S1} = R_{S2} = R_S$, that $L_{cab1} = L_{cab2} = L$, and that the two termination capacitors are equal and have capacitance values C. The current supplied by the transmit buffer in its saturation mode is $i_d$.

$$V_L(t) = \frac{2 \times i_d \times L}{\sqrt{C \times (4L - C \times (R_S + Z_0)^2)}} \times e^{-\left[\frac{R_S + Z_0}{2L}\right]t} \times \sin\left(\frac{\sqrt{4L - C \times (R_S + Z_0)^2}}{2L \times \sqrt{C}} t\right) \quad (24)$$

$$V_L(t) = \frac{i_d \times t}{C} \times e^{-\left[\frac{R_S + Z_0}{2L}\right]t} \quad (25)$$

$$V_{Lpeak} = \frac{2 \times i_d \times L}{C \times (R_S + Z_0)} \times e^{-1} \quad (26)$$

From examining Equations 24–26, it is evident that $V_L(t)$ and $V_{Lpeak}$ are directly proportional to the value of the saturation current $i_d$ of the transmit buffer 402. Accordingly, the "stronger" the transmit buffer 402 (i.e., the greater its saturation current) the more rapidly it charges the termination capacitor. As a result of rapid charging, the signal slope is higher. The greater the signal slope, the greater the coupling to the adjacent wire. Clearly, in order to minimize cross-talk it is necessary to limit $i_d$. It will be appreciated by those of ordinary skill in the art that for any CMOS transmit buffer, saturation current is readily controlled.

Figure 5:
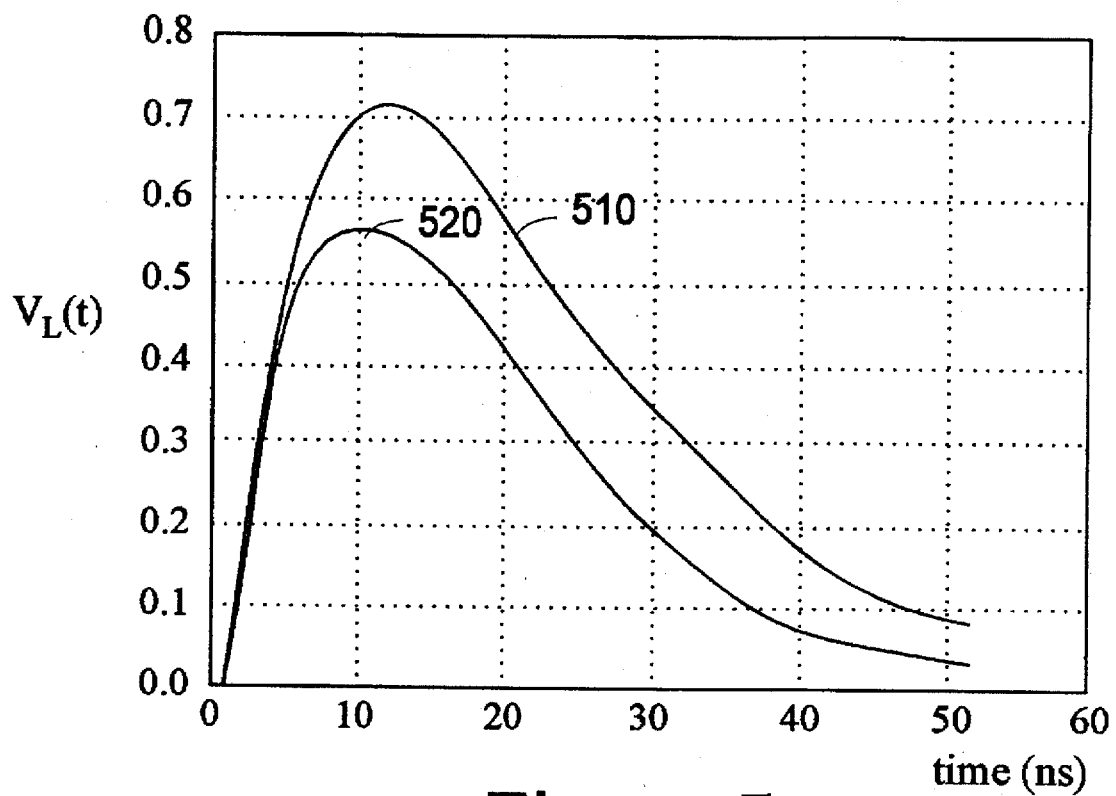
FIG. 5 is a graph showing waveforms for cross-talk voltage signals in two cases: (i) where a termination capacitor is connected at the input of a transmission line, and (ii) where a termination capacitor is connected at the output of a buffer driving the transmission line, showing a reduction in cross-talk voltage, according to the present invention.

FIG. 5 is a graph showing plots of $V_L(t)$ for the first case (trace 510) where the termination capacitor is at the transmit end (input) of the transmission line and for the second case (trace 520) where the termination capacitor is at the output of the transmit buffer. The following values are assumed:

$R_D = 25 \Omega$, $i_d = 85$ ma, $R_S = 33 \Omega$, $C = 470$ pf, $Z_0 = 62 \Omega$, and $L_{cab1} = L = 0.41$ µH. Evidently, using the assumed values, the cross talk voltage is greater when the termination capacitor is connected at the transmit end of the transmission line than when it is connected at the output of the transmit buffer.

A first order approximation of $i_d$ and $R_d$ can be calculated using Equations 27 and 28, respectively. Substituting these values in Equation 23 and 26, and dividing them by one another yields Equation 29. Finally, substituting typical values in Equation 29, reveals that $V_{Lpeak(Equation\ 26)}/V_{Lpeak\ (Equation\ 23)} > 1$ for $k > 0.025[A/V^2]$.

$$i_d = 0.5 \times k \times (V_{cc} - vT)^2 \quad (27)$$

$$R_d = \frac{1}{k \times (V_{cc} - vT)} \quad (28)$$

$$\frac{V_{Lpeak(Equation\ 26)}}{V_{Lpeak(Equation\ 23)}} = \frac{(V_{cc} - vT) \times Z_0}{V_{cc} \times (R_S + Z_0)} \times \frac{k \times (V_{cc} - vT) \times R_S + 1}{2} \quad (29)$$

Figure 1:
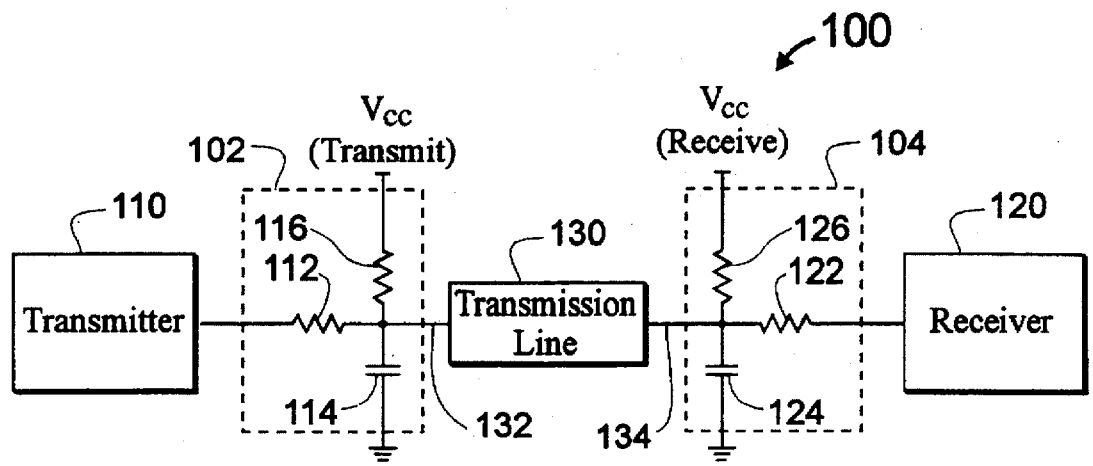
FIG. 1 is a block diagram of a communication system employing prior-art transmission-line termination techniques.

The prior-art termination network shown in FIG. 1 corresponds to the first cases considered hereinabove with respect to reflections and cross talk. The termination networks of the present invention, illustrated in FIGS. 2A and 2B, correspond to the second cases considered hereinabove with respect to reflections and cross talk.

In the absence of other requirements, the best termination circuit configuration for reducing the number of incident and reflected waves is a purely resistive network without a capacitor which exactly matches the characteristic impedance of a transmission line to which it connects. However, the demand for low EMI requires that measures be taken to "slow up" signals on transmission lines.

The addition of a capacitor to a termination network significantly slows signal transitions. In light of the foregoing analysis of signal reflections, however, it is better to connect the capacitor at the transmit buffer's output, as shown in FIGS. 2A and 2B, than at the transmit end of the transmission line, as shown in the prior-art termination network of FIG. 1. This configuration, (i.e., capacitor connected at the transmit buffer output) is also referable for minimizing cross talk, provided that the saturation current of the transmit buffer is not too great. In combination with an RC filter at the receiver's input, the inventive technique significantly reduces cross talk. It should be understood that an RC filter is likewise implemented at the receiver's termination by $R_S$ and C.

Although the invention has been illustrated and described in detail in the drawings and in the foregoing description, the same is to be considered as illustrative and not restrictive in character—it being understood that only preferred embodiments have been shown and described, and that various modifications thereof will be readily apparent to one with ordinary skill in the art. All such modifications are intended to fall within the scope of the present invention as defined by the following claims.

Figure 2C:
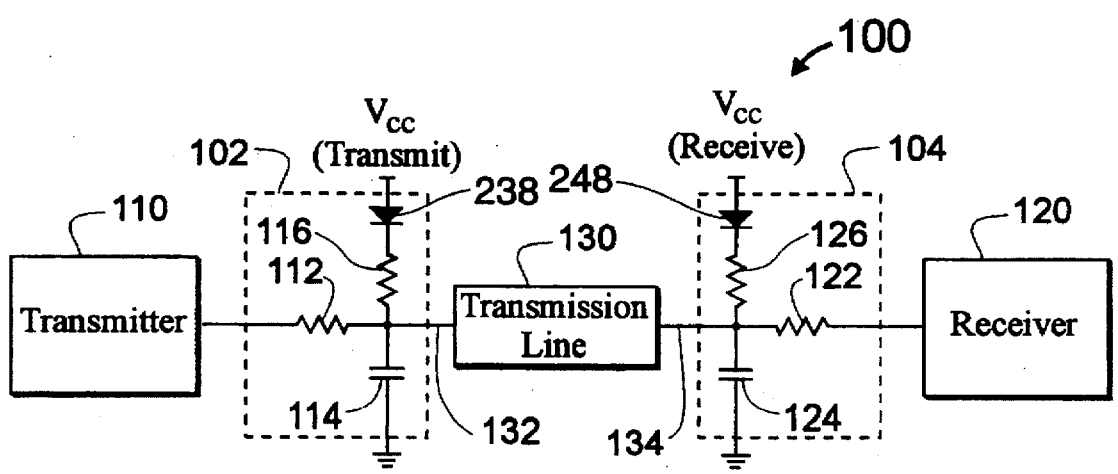
FIG. 2C is a block diagram of a communication system employing a transmission line terminated according to another embodiment of the present invention.

For example, as shown in FIG. 2C it is within the scope of this invention that diodes (238 and 248) could be connected in series with the pull-up resistors (116 and 126) of the prior art termination circuit (102 or 104, respectively) in a manner similar to the connection of diodes (218 and 228) in series with pull-up resistors (216 and 226, respectively) of the termination circuits (202 and 204, respectively) of the FIG. 2A embodiment of the invention.

In the claims set forth below, certain of the claims set forth resistance values (in ohms) for the serial and pull-up resistors, and capacitance values (in picofarads) for the capacitor. These values are intended to be approximate as, for example, plus or minus 10% (ten percent). Additionally, resistor, capacitor and diode components are set forth as having "terminals", the meaning of which (e.g., material ends, poles, or the like) will be understood by those skilled in the art to which this invention pertains not to limit the invention to discrete components having wire leads.

What is claimed is:

1. Termination circuit for a transmission line having an end connected to a parallel port, comprising:

a serial resistor having a first terminal connected to the parallel port and a second terminal connected to the end of the transmission line;

a pull-up resistor having a third terminal connected to the second terminal of the serial resistor and having a fourth terminal connected to a supply voltage; and a capacitor having a fifth terminal connected to the first terminal of the serial resistor and having a sixth terminal connected to a ground potential.

2. Termination circuit according to claim 1, wherein the serial resistor has a resistance of 33 ohms; and the capacitor has a capacitance of 470 picofarads.

3. Termination circuit according to claim 1, wherein the serial resistor has a resistance of 33 ohms; and the capacitor has a capacitance of 330 picofarads.

4. Termination circuit according to claim 3, wherein the pull-up resistor has a resistance of 4,700 ohms.

5. Termination circuit according to claim 1, wherein the serial resistor has a resistance of 100 ohms; and the capacitor has a capacitance of 680 picofarads.

6. Termination circuit according to claim 5, wherein the pull-up resistor has a resistance of 4,700 ohms.

7. Termination circuit according to claim 1, wherein the serial resistor has a resistance of 22 ohms; and the capacitor has a capacitance of 220 picofarads.

8. Termination circuit according to claim 7, wherein the pull-up resistor has a resistance of 4,700 ohms.

9. Termination circuit according to claim 1, wherein the pull-up resistor has a resistance of 1,000 ohms.

10. Termination circuit according to claim 1, wherein the pull-up resistor has a resistance of 4,700 ohms.

11. Termination circuit according to claim 1, wherein the transmission line is a high-speed, hi-directional transmission line.

12. Termination circuit according to claim 1, wherein:
    the capacitor, serial resistor and pull-up resistor are physically positioned as close as possible to a connector of the parallel port.

13. Termination circuit for a transmission line having an end connected to a parallel port, comprising:

a serial resistor having a first terminal connected to the, parallel port and a second terminal connected to the end of the transmission line:

a null-up resistor having a third terminal connected to the second terminal of the serial resistor and having a fourth terminal;

a capacitor having a fifth terminal connected to the first terminal of the serial resistor and having a sixth terminal connected to a ground potential; and a diode having a first terminal connected to the fourth terminal of the pull-up resistor and having it second terminal connected to a supply voltage.

14. Termination circuit according to claim 13, wherein the fourth terminal, of the pull-up resistor, is connected to a pull-up voltage.

15. Termination circuit according to claim 13, wherein the serial resistor has a resistance of 22 ohms; and the capacitor has a capacitance of 220 picofarads.

16. Termination circuit according to claim 15, wherein the pull-up resistor has a resistance of 1,000 ohms.

17. Termination circuit according to claim 15, wherein the pull-up resistor has a resistance of 4,700 ohms.

18. Termination circuit according to claim 13, wherein the serial resistor has a resistance of 100 ohms; and the capacitor has a capacitance of 680 picofarads.

19. Termination circuit according to claim 13, wherein the serial resistor has a resistance of 33 ohms; and the capacitor has a capacitance of 470 picofarads.

20. Termination circuit according to claim 19, wherein the pull-up resistor has a resistance of 1,000 ohms.

21. Termination circuit according to claim 19, wherein the pull-up resistor has a resistance of 4,700 ohms.

22. Method of terminating a transmission line having an end connected to a parallel port having a connector, comprising the steps of:

connecting a first terminal of a serial resistor to the parallel port and a second terminal of the serial resistor to the end of the transmission line;

connecting a first terminal of a capacitor to the first terminal of the serial resistor and a second terminal of the capacitor to ground; and connecting a first terminal of a pull-up resistor to the end of the transmission line and a second terminal of the pull-up resistor to a supply voltage.

23. Method according to claim 22, further comprising:
    physically positioning the capacitor and the resistors as close as possible to the connector of the parallel port.

24. Method according to claim 22, further comprising:
    connecting a diode between the pull-up resistor and the supply voltage.

25. Method according to claim 24, and further comprising:
    connecting a pull-up voltage to a connection of the pull-up resistor and the diode.

26. Termination circuit for a transmission line having an end and communicating signals with a parallel port, comprising:

a serial resistor having a first terminal connected to the parallel port and a second terminal connected to the end of the transmission line;

a capacitor having a third terminal connected to the first terminal of the serial resistor and having a fourth terminal connected to a ground potential;

a pull-up resistor having a fifth terminal connected to the second terminal of the series resistor and having a sixth terminal; and a diode having a seventh terminal connected to the sixth terminal of the pull-up resistor and an eighth terminal connected to a power supply.

27. Termination circuit according to claim 26, wherein:
    the seventh terminal of the diode is a cathode; and
    the eighth terminal of the diode is an anode.

28. Termination circuit according to claim 26, wherein:
    the transmission line is a high-speed, bi-directional transmission line.

29. Termination circuit for a transmission line having an end and communicating signals with a parallel port, comprising:

a serial resistor having a first terminal connected to the parallel port and a second terminal connected to the end of the transmission line;

a capacitor having a third terminal connected to the second terminal of the serial resistor and having a fourth terminal connected to a ground potential;

a pull-up resistor having a fifth terminal connected to the second terminal of the series resistor and having a sixth terminal; and a diode having a seventh terminal connected to the sixth terminal of the pull-up resistor and an eighth terminal connected to a power supply.

30. Termination circuit according to claim 29, wherein:

the seventh terminal of the diode is a cathode; and the eighth terminal of the diode is an anode.

31. Termination circuit according to claim 29, wherein:

the transmission line is a high-speed, hi-directional transmission line.

32. Method of terminating a transmission line having an end connected to a parallel port having a connector, comprising the steps of:

connecting a serial resistor between the parallel port and the transmission line;

connecting a capacitor between the parallel port and ground;

connecting a pull-up resistor to the end of the transmission line; and connecting a diode between the pull-up resistor and a supply voltage.

33. Method according to claim 32, and further comprising:

connecting a pull-up voltage to a connection of the pull-up resistor and the diode.

* * * * *

UNITED STATES PATENT AND TRADEMARK OFFICE
CERTIFICATE OF CORRECTION

PATENT NO. : 5,686,872
DATED : November 11, 1997
INVENTOR(S) : RAFAEL FRIED et al.

It is certified that error appears in the above-identified patent and that said Letters Patent is hereby corrected as shown below:

In Col. 17, line 41, delete "hi-directional" and replace with --bi-directional--.

In Col. 17, line 52, delete "line:" and replace with --line;--.

In Col. 17, line 53, delete "null-up" and replace with --pull-up--.

In Col. 17, line 60, delete "it" and replace with --a--.

In Col. 19, line 11, delete "hi-directional" and replace with --bi-directional--.

Signed and Sealed this

Third Day of February, 1998

BRUCE LEHMAN

*Attest:*

*Attesting Officer*  Commissioner of Patents and Trademarks